UNITED STATES PATENT OFFICE.

CARL OSCAR MÜLLER, OF BASLE, SWITZERLAND, ASSIGNOR TO BASLE CHEMICAL WORKS BINDSCHEDLER, OF SAME PLACE.

RHODAMIN DYE.

SPECIFICATION forming part of Letters Patent No. 576,222, dated February 2, 1897.

Application filed June 30, 1896. Serial No. 597,643. (Specimens.) Patented in France March 6, 1895, No. 245,593, and in England March 8, 1895, No. 4,985.

*To all whom it may concern:*

Be it known that I, CARL OSCAR MÜLLER, chemist, a subject of the Emperor of Germany, residing at Basle, Switzerland, have invented certain Improvements in the Manufacture of Rhodamin Dyes, (which have been patented in France by Letters Patent No. 245,593, dated March 6, 1895, and in England by Letters Patent No. 4,985, dated March 8, 1895,) of which the following is a clear and complete specification.

The new dialkylamidoöxybenzoyl-benzoic acids, which are fully described in another application, Serial No. 597,642, filed June 30, 1896, for Letters Patent of the inventor, and which are obtained by the condensation of one molecule anhydrous phtalic acid with one molecule dialkylmetaämidophenol, can easily be converted into symmetrical and unsymmetrical rhodamin dyes by their condensation with the alkyl derivatives of metaämidophenol in presence of a convenient agent of condensation, as, for instance, concentrated sulfuric acid. The unsymmetrical rhodamin dyes thus obtained are new articles of manufacture and cannot be produced by any other of the hitherto-known processes for the manufacture of rhodamin dyes by means of anhydrous phtalic acid and metaämidophenols.

Example I: Fourteen kilograms dimethylamidoöxybenzoyl-benzoic acid and ten kilograms diethylmetaämidophenol are dissolved in seventy kilograms sulfuric acid of about ninety-eight per cent. ($H_2SO_4$.) The solution is heated to about 110° centigrade until a test gives a clear solution in water. Then it is poured into about eight hundred liters of water and boiled. The dyestuff then is precipitated by an addition of sea-salt. Its base is dissolved in diluted hydrochloric acid, from which the dyestuff is crystallized in the form of the hydrochlorate. The base of this unsymmetrical dimethyldiethyl rhodamin dye has probably the following constitutional formula:

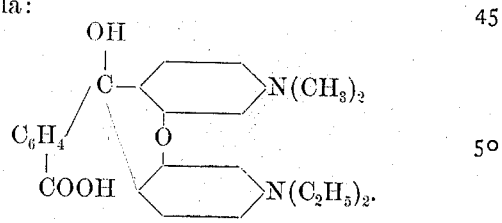

The dyestuff constitutes green crystals and dyes wool, cotton, and silk a fine red. It is soluble in alcohol with brick-red fluorescence. It dissolves easily in water. From its aqueous solutions the dyestuff is precipitated by an addition of hydrochloric acid. It dissolves in concentrated sulfuric acid and in hydrochloric acid with a yellow coloration, which turns to red on an addition of water. This unsymmetrical rhodamin dyestuff can also be produced by the condensation of diethylamidoöxybenzoyl-benzoic acid with dimethylmetaämidophenol.

Example II: Twenty kilograms dimethylamidoöxybenzoyl-benzoic acid and fifteen kilograms monoethylmetaämidophenol are dissolved in a mixture of fifty kilograms water and two hundred kilograms sulfuric acid, (monohydrate.) The whole is heated from 150° to 160° centigrade, and when a test gives a clear solution in warm water it is poured into about seven hundred liters water. The dyestuff is precipitated by sea-salt filtered and purified by recrystallization from hot water acidulated by sulfuric acid. It dyes wool, silk, and, with tannin, mordanted cotton in red tints.

The sulfate of the dyestuff constitutes green needles soluble in water and in alcohol. Its alcoholic solution has a greenish yellow fluorescence.

The dyestuff base is soluble in alcohol, ether, and benzene. Sulfuric acid (monohydrate) and hydrochloric acid dissolve the coloring-matter with a yellow color.

What I claim as my invention, and wish to secure by Letters Patent, is—

1. The improvement in the manufacture of rhodamin dyes, consisting in the production of a coloring-matter by the condensation of one molecule of a dialkylamidoöxybenzoyl-benzoic acid derived from one molecule anhydrous phtalic acid and one molecule of a dialkylmetaämidophenol, with one molecule of an alkyl derivative of metaämidophenol, as described.

2. The improvement in the manufacture of rhodamin dyes, consisting in the production of a coloring-matter by the condensation of one molecule of a dialkylamidoöxybenzoyl-benzoic acid derived from one molecule anhydrous phtalic acid and one molecule of a dialkylmetaämidophenol, with one molecule of a dialkylmetaämidophenol, as described.

3. As a new article of manufacture the herein-described unsymmetrical dimethyl-diethyl rhodamin dyestuff, constituting green crystals, dyeing wool, silk and cotton a fine red, soluble in water, dissolving in alcohol with brick-red fluorescence and dissolving in concentrated sulfuric acid and in hydrochloric acid with yellow coloration, which turns to red on adding water, the said dyestuff being precipitated from its aqueous solutions by an addition of hydrochloric acid.

In witness whereof I have hereunto signed my name in the presence of two subscribing witnesses.

CARL OSCAR MÜLLER.

Witnesses:
EMIL PARAVICINI,
AMAND RITTER.